(12) United States Patent
Chen

(10) Patent No.: US 7,025,186 B2
(45) Date of Patent: Apr. 11, 2006

(54) BICYCLE RATCHET BUSHING

(75) Inventor: Chun-Hsung Chen, Taichung Hsien (TW)

(73) Assignee: Joy Industrial Co., Ltd., Taichung Hsien (TW)

( * ) Notice: Subject to any disclaimer, the term of this patent is extended or adjusted under 35 U.S.C. 154(b) by 0 days.

(21) Appl. No.: 10/745,593

(22) Filed: Dec. 29, 2003

(65) Prior Publication Data

US 2005/0139443 A1 Jun. 30, 2005

(51) Int. Cl.
*F16D 41/30* (2006.01)

(52) U.S. Cl. .................... 192/64; 192/46; 192/107 T; 192/108

(58) Field of Classification Search ................. 192/64, 192/46, 107 T, 108, 45.1; 74/577 M, 577 R, 74/575
See application file for complete search history.

(56) References Cited

U.S. PATENT DOCUMENTS 3,166,171 A * 1/1965 Schwerdhofer et al. ....... 192/64
4,328,882 A * 5/1982 Isobe .......................... 192/64
5,857,390 A * 1/1999 Whiteford ..................... 81/62
6,155,394 A * 12/2000 Shook ......................... 192/46

FOREIGN PATENT DOCUMENTS

DE    102 18 664 A1 * 11/2003

\* cited by examiner

Primary Examiner—Rodney H. Bonck
(74) Attorney, Agent, or Firm—Birch, Stewart, Kolasch & Birch, LLP

(57) ABSTRACT

This invention discloses a bicycle ratchet bushing, comprising a bushing for coupling to a connecting axle rod to drive the bicycle wheel to rotate, a pawl ring disposed on the inner side of the bushing, a plurality of pawls interdentally dispersed around the outer periphery of the ratchet ring, a resilient ring surrounding each pawl, such that the inner end of the pawl is a pivotal circular turning end, and the outer end is a moving end capable of opening outwards and retracting, and a pawl ring being sheathed outside the ratchet wheel, such that a buffer space is designed at the internal diameter of the pawl ring to prevent noise production from friction between the resilient ring and the pawl ring of the bushing.

1 Claim, 6 Drawing Sheets

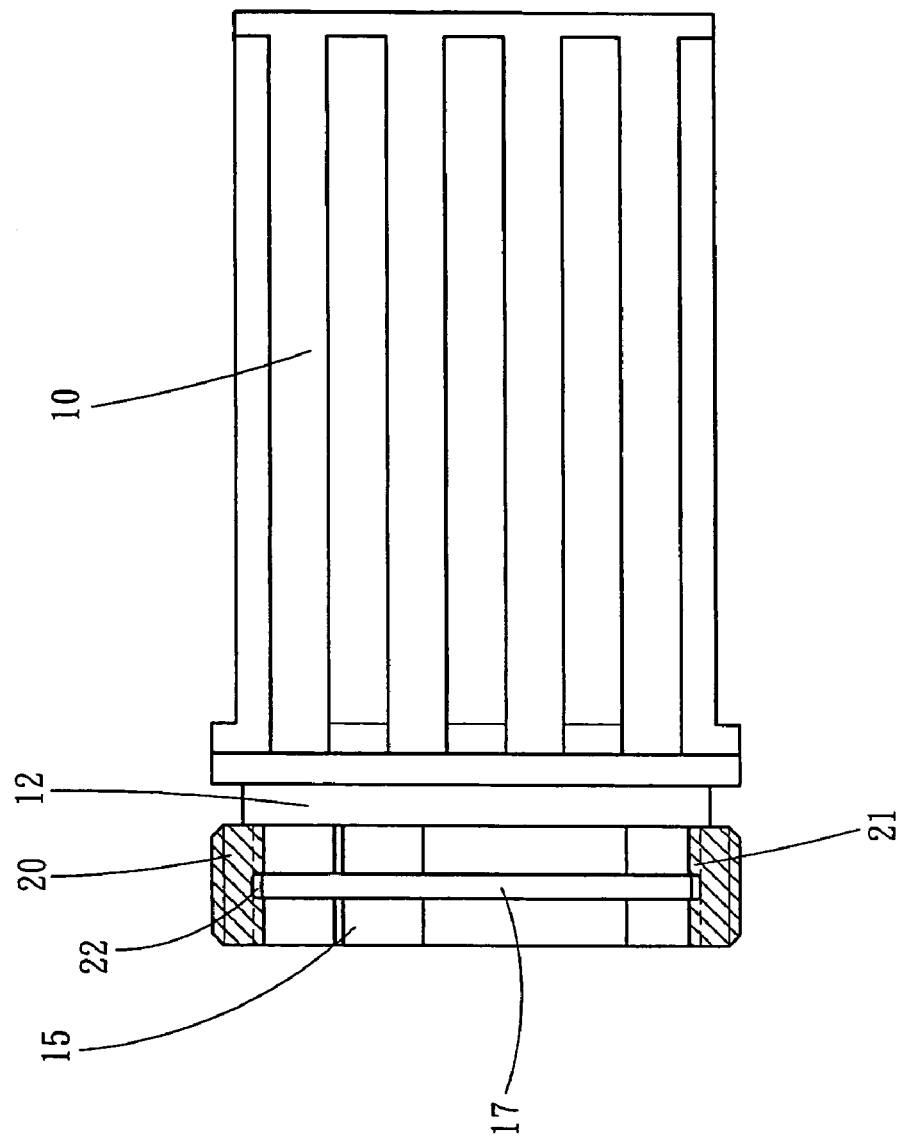

BICYCLE RATCHET BUSHING

FIELD OF THE INVENTION

The present invention generally relates to ratchet bushings of bicycles and more particularly, to a design of ratchet bushings for bicycles to reduce noise production.

BACKGROUND OF THE INVENTION

Please refer to FIGS. 1, 2, and 3 for a traditional ratchet bushing assembly for market-standard bicycles.

The cylindrical bushing 1 is and has an axle hole at its center for receiving an axle rod. A plurality of embedded bars radially fix around the outer wall. A ratchet wheel 2 extends into the bushing 10 having three pawls 3 radially dispersed around its outer wall with the hinged end of each pawl 3 being circular allowing the concave chamber 4 of the ratchet wheel 2 to rotate. The distal end of the pawl 3 is a moveable wedge-shaped tooth.

A seam 5 located inside the perimeter of the ratchet wheel 2 houses a C-shaped retaining ring 6 which forces each pawl 3 to extend outwards such that each unhinged end of a pawl 3 protrudes from the ratchet wheel 2 to catch onto a pawl ring 7. The pawl ring 7 sheathes the ratchet wheel 2 and a screw thread on the outer periphery couples to the drum of the bicycle. A plurality of interdental spaces 8 located on the inner perimeter of the pawl ring 7 corresponds to size of the wedge-shaped tooth of each pawl 3.

When the axle rod is rotated clockwise to turn the bushing 1, each pawl 3 precisely engages with the interdental spaces 8 of the pawl ring 7 to drive the drum to rotate. Conversely, when the axle rod is rotated anticlockwise, each pawl 3 on the outer wall of the ratchet wheel 1 cannot engage with the interdental spaces 8 of the pawl ring 7, such that the pawl ring 7 will run in idle and does not drive the drum to rotate. In other words, a cyclist pedals to drive a bicycle wheel forwards, reversing the pedaling direction has no effect. However, as each pawl 3 at the periphery of the ratchet wheel 2 is pressed by the inner wall of the pawl ring 7, the C-shaped retaining ring 6 is forced outwards such that the external wall of the retaining ring 6 and the inner wall of the pawl ring 7 generates noise from the friction.

SUMMARY OF THE INVENTION

The primary objective of the present invention is to provide a ratchet bushing for bicycles, which comprises a bushing, a pawl ring, a ratchet wheel located on the inner wall of the bushing, a plurality of pawls displaced around the outer periphery of the ratchet wheel, a resilient ring to push the inner edge of each pawl so that the non-pivotal connecting end jutting outwards to engage with the teeth of and drive the pawl ring. If the pawl ring is rotated in the opposite direction, each pawl contracts inwards to define an idle state. This invention sets a buffer space in the ratchet ring with respect to the position of the resilient ring of the bushing to prevent noise produced by friction between the resilient ring and the ratchet ring.

BRIEF DESCRIPTION OF THE DRAWINGS

FIG. 6 is another cross-sectional diagram demonstrating the movement of a preferred embodiment of the present invention.

DETAILED DESCRIPTION OF THE PREFERRED EMBODIMENTS

Figure 1:
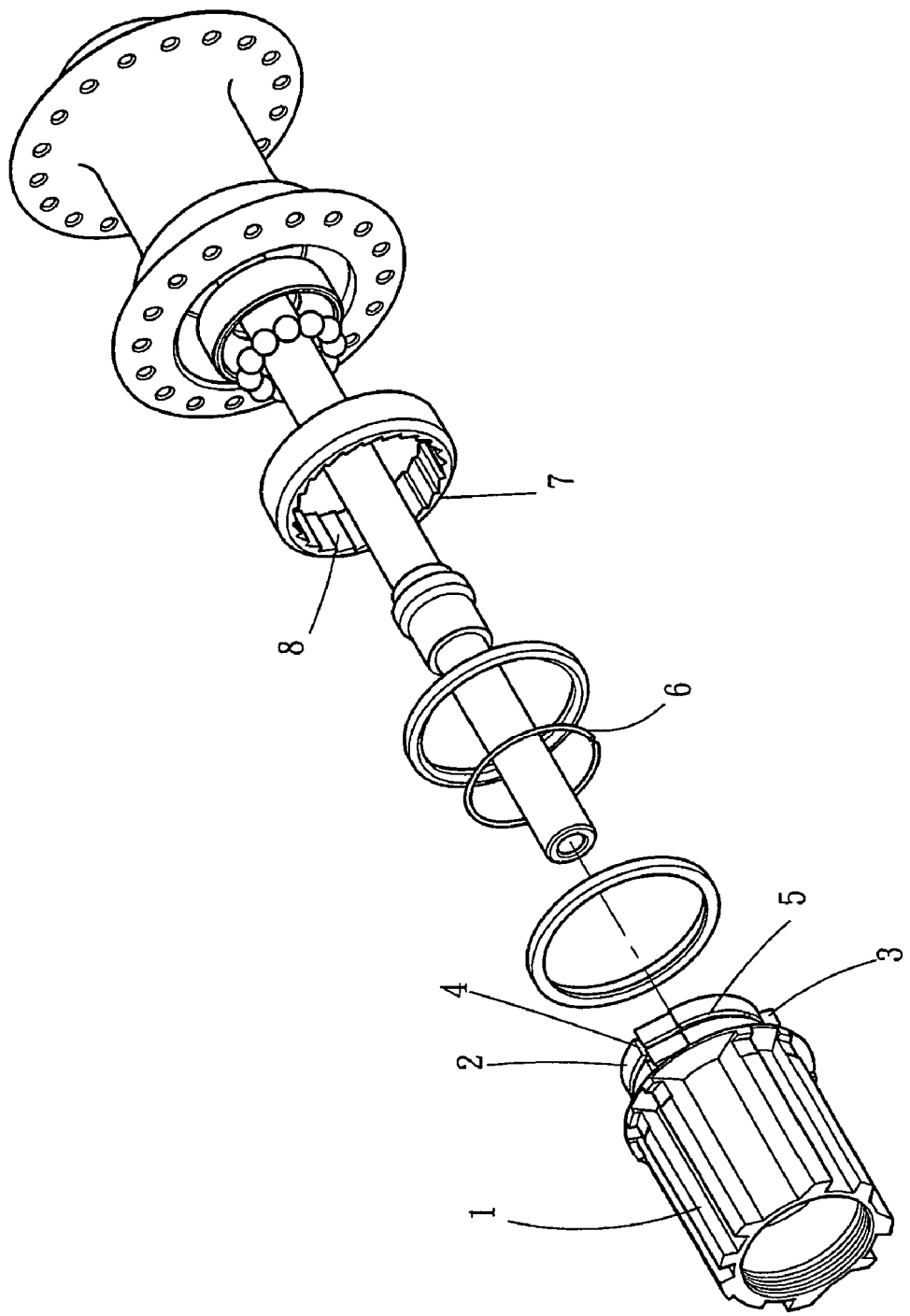
FIG. 1 is a perspective diagram of a prior-art ratchet bushing for bicycles.
Figure 2:
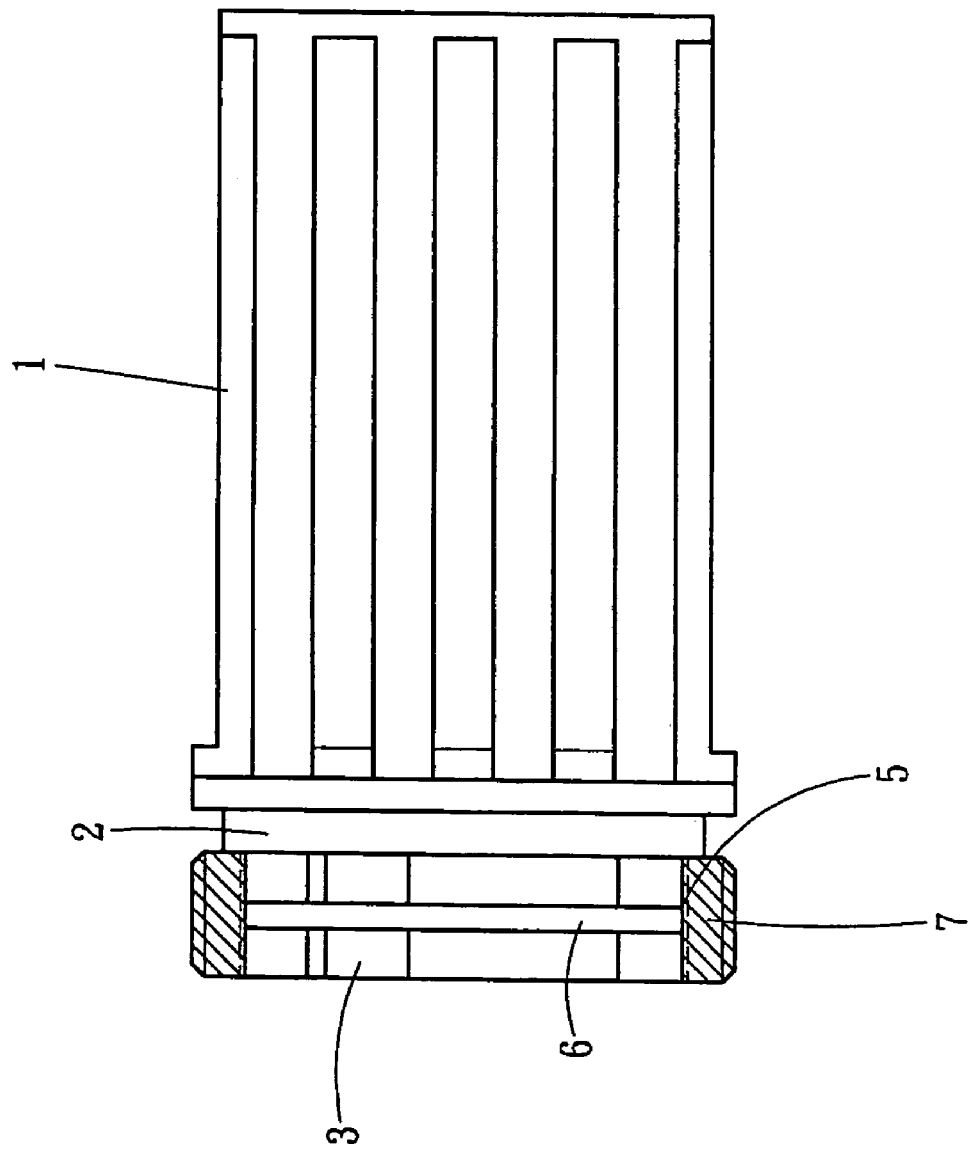
FIG. 2 is an illustrative diagram of a prior-art ratchet bushing for bicycles along the direction of the diameter of the bushing.
Figure 3:
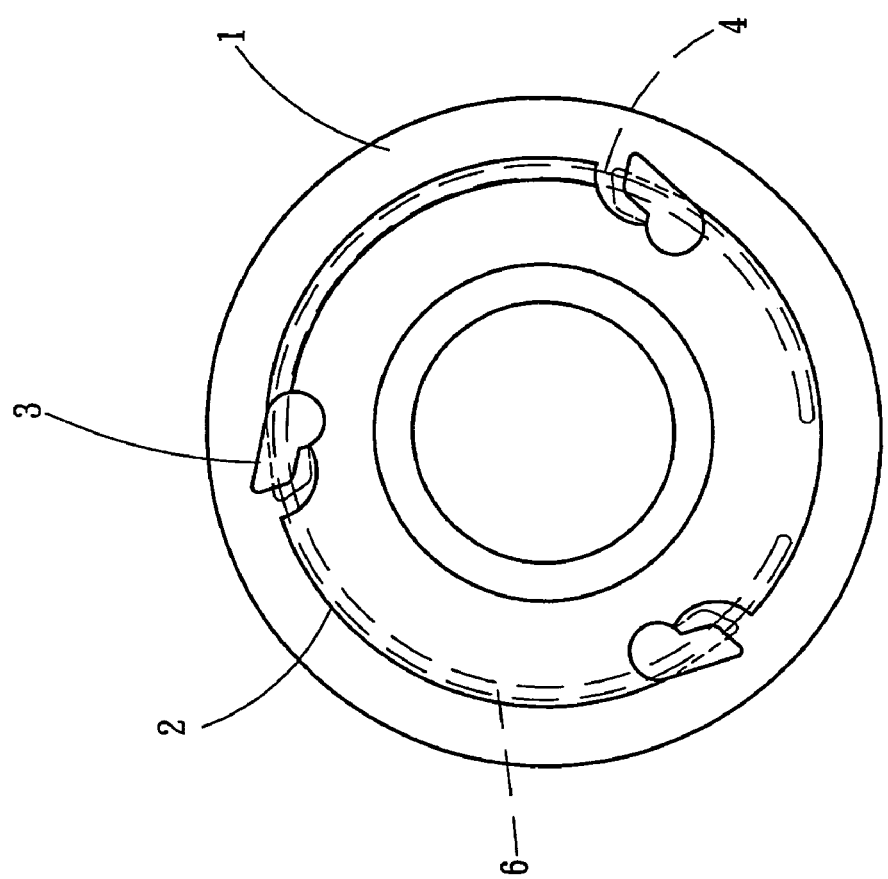
FIG. 3 is a side-view diagram of a prior-art ratchet bushing for bicycles.
Figure 4:
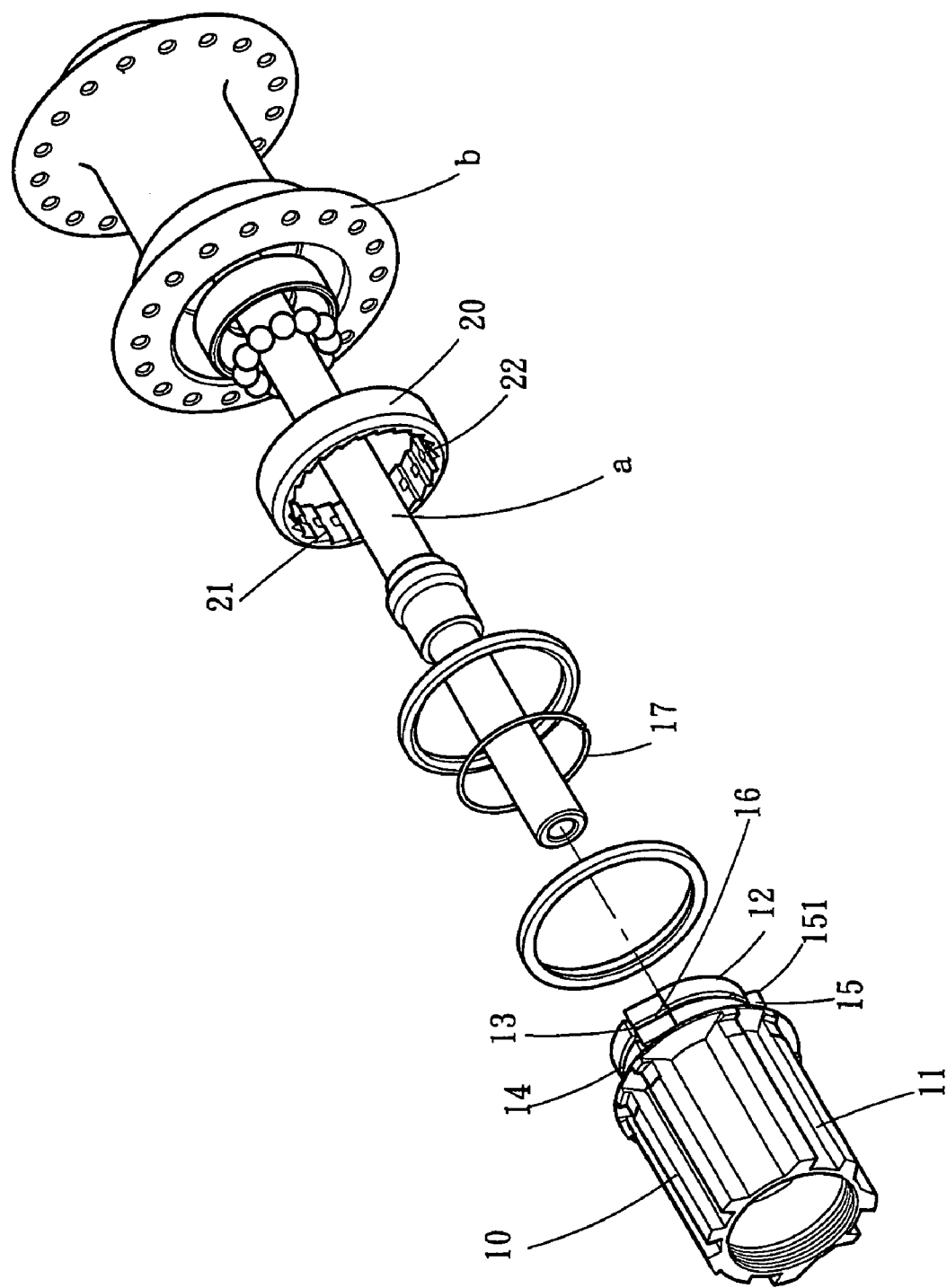
FIG. 4 is a perspective diagram of a preferred embodiment of the present invention.
Figure 5:
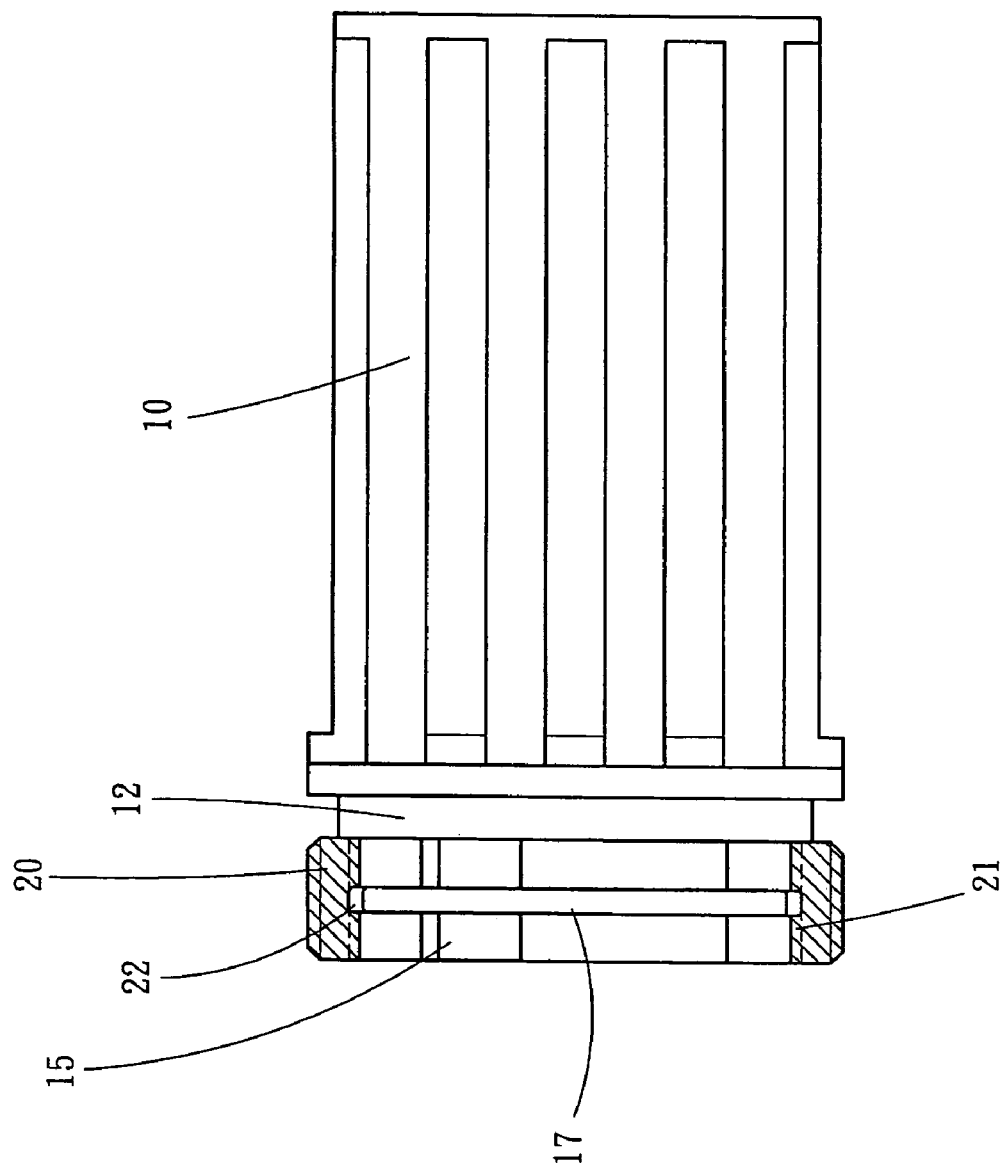
FIG. 5 is a cross-sectional diagram demonstrating the movement of a preferred embodiment of the present invention.

Please refer to FIGS. 4 and 5 for the bicycle ratchet bushing of this invention, which has its center passing through an axle rod a, to drive an axle rod a to rotate, and couples to a drum b which also rotates. As shown here, the bushing 10 in accordance with the invention in practice is cylindrical in shape and has a plurality of embedded bars 11 radially dispersed around its' outer wall. A circular ratchet wheel 12 protrudes outwards from the bushing 10 having three accommodating grooves 13 evenly distributed along the outer perimeter of the ratchet wheel 12. A limit groove 14 is also located on the outer wall; please refer to FIG. 3 for a comparison with the prior art. A ratchet 15 fits into the accommodating grooves 13, with one face of the ratchet 15 circular to match with the shape of the accommodating groove and the pivotal connection for rotation. The other ratchet 15 face is a moveable end 151 with wedge-shaped teeth ratchet wheel. When the moveable end 151 extends outwards, the teeth extend outside the external diameter of the ratchet wheel 12. The wedge teeth are accommodated inside the groove 13 when the moveable end 151 curtails. A groove seam 16 is located on the outer side of each ratchet 15.

In the embodiments shown, a resilient ring 17 (such as a C-shaped retaining ring) couples to a limit groove 14 on the ratchet wheel 12 and tied around the groove seam 16 of each pawl 15 to jointly close 3 pawls 15 into the accommodating groove 13 of the ratchet wheel and constantly keep the moving ends of the three pawls to extend outside the external diameter of the ratchet wheel;

A pawl ring 20, being sheathed onto the bushing 10, and a plurality of interdental spaces 21 being disposed on the inner wall of the pawl ring 20 corresponding to each pawl 15 of the ratchet wheel 12, such that the bushing 10 being embedded and engaged with the pawl ring 20, and a buffer space 22 centrally disposed on the inner wall of the pawl ring 20, and the buffer space 22 corresponding to the position of the resilient ring 17 of the ratchet wheel 12 of the bushing 10.

By means of the aforementioned structure, when the axle rod a rotates clockwise to turn the bushing 10 accordingly, the moving ends 151 of the three pawls 15 precisely engage with the interdental spaces 21 of the pawl ring 20 to drive the pawl ring 20 to rotate and further rotate the drum b of the bicycle. When the bicycle is peddled in reverse, the axle rod a is rotates anticlockwise. The three pawls 15 of the ratchet wheel 12 are pressed by the inner wall of the pawl ring 20, such that the moving end 151 of each pawl 15 retracts into the accommodating groove 13 of the ratchet wheel 12. The pawl ring 20, now running idle cannot drive the drum b of the bicycle to rotate. The resilient ring 17 is forced outwards and usually extends outside the outer wall of the ratchet wheel 12 (as shown in FIG. 6). Since the pawl ring 20 of this invention has a u-shaped buffer space 22 corresponding to the area occupied by the resilient ring 17, contact between the resilient ring 17 and the inner wall of the pawl ring 20 is avoided; thus preventing noise.

While the invention has been described by way of example and in terms of a preferred embodiment, it is to be understood that the invention is not limited thereto. To the contrary, it is intended to cover various modifications and similar arrangements and procedures. The scope of the appended claims therefore should be according to the broadest interpretations to encompass all such modifications and similar arrangements and procedures.

What is claimed is:

1. A bicycle ratchet bushing with an axle rod at a center thereof and the outer-wall coupled to a drum, comprising:

a bushing, having a first end a second end opposite to the first end, a ratchet wheel extending from the second end, a limit groove disposed around an external wall of the ratchet wheel, and at least one accommodating groove along the circumference of the ratchet wheel;

at least one pawl, having one circular turning end fitting into said accommodating groove, a moveable end with wedge- shaped teeth, and a seam on an outer side of the at least one pawl;

a resilient ring, the resilient ring being coupled to the limit groove and being disposed in the seam, such that the resilient ring surrounding the at least one pawl to control expanding the moveable end outside the ratchet wheel and retracting the moveable end into said accommodating groove;

a pawl ring circularly sheathed onto a sleeve of said bushing, a plurality of interdental spaces being disposed on an inner wall of said pawl ring and corresponding to the at least one pawl of said ratchet wheel, a buffer space being circularly disposed onto the inner wall of said pawl ring, said buffer space corresponding to an outer wall of said resilient ring, thereby preventing noise produced from contact between the resilient ring and the pawl ring of said bushing.

* * * * *